(12) United States Patent
Tristram

(10) Patent No.: US 6,988,818 B2
(45) Date of Patent: Jan. 24, 2006

(54) WHEEL LIGHTS

(75) Inventor: James Tristram, 125 Royston Street, Liverpool L7 1PX (GB)

(73) Assignee: James Tristram, Liverpool (GB)

( * ) Notice: Subject to any disclaimer, the term of this patent is extended or adjusted under 35 U.S.C. 154(b) by 59 days.

(21) Appl. No.: 10/467,631

(22) PCT Filed: Aug. 14, 2001

(86) PCT No.: PCT/GB01/03646

§ 371 (c)(1),
(2), (4) Date: Jul. 30, 2003

(87) PCT Pub. No.: WO02/060726

PCT Pub. Date: Aug. 8, 2002

(65) Prior Publication Data

US 2004/0066656 A1    Apr. 8, 2004

(30) Foreign Application Priority Data

Jan. 31, 2001   (GB) .................................... 0102528

(51) Int. Cl.
*B60Q 1/32*   (2006.01)

(52) U.S. Cl. ................ 362/500; 362/543; 362/545
(58) Field of Classification Search ................ 362/500, 362/543, 545; 152/154.2
See application file for complete search history.

(56) References Cited

U.S. PATENT DOCUMENTS

| | | | |
|---|---|---|---|
| 5,475,572 A | 12/1995 | Tseng | 362/78 |
| 5,653,523 A | 8/1997 | Roberts | 362/78 |
| 5,810,450 A | 9/1998 | Tsu et al. | 301/5.3 |
| 6,241,371 B1 | 6/2001 | Dai | 362/500 |
| 6,485,169 B1 * | 11/2002 | Ragner | 362/500 |

FOREIGN PATENT DOCUMENTS

| | | |
|---|---|---|
| GB | 2313350 | 11/1997 |
| JP | 110170819 | 6/1999 |
| WO | 96/29235 | 9/1996 |

* cited by examiner

*Primary Examiner*—Sandra O'Shea
*Assistant Examiner*—James W Cranson, Jr.
(74) *Attorney, Agent, or Firm*—Reed Smith LLP

(57) ABSTRACT

A lighting system for wheel 3 having a tyre, comprises at least one powered light emitter 1, wherein the at least one light emitter 1 is at least partly embedded in a part of the tyre of wheel 3.

38 Claims, 4 Drawing Sheets

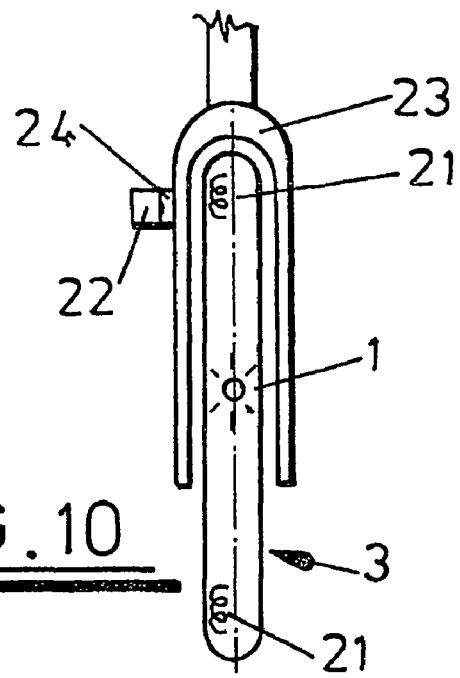
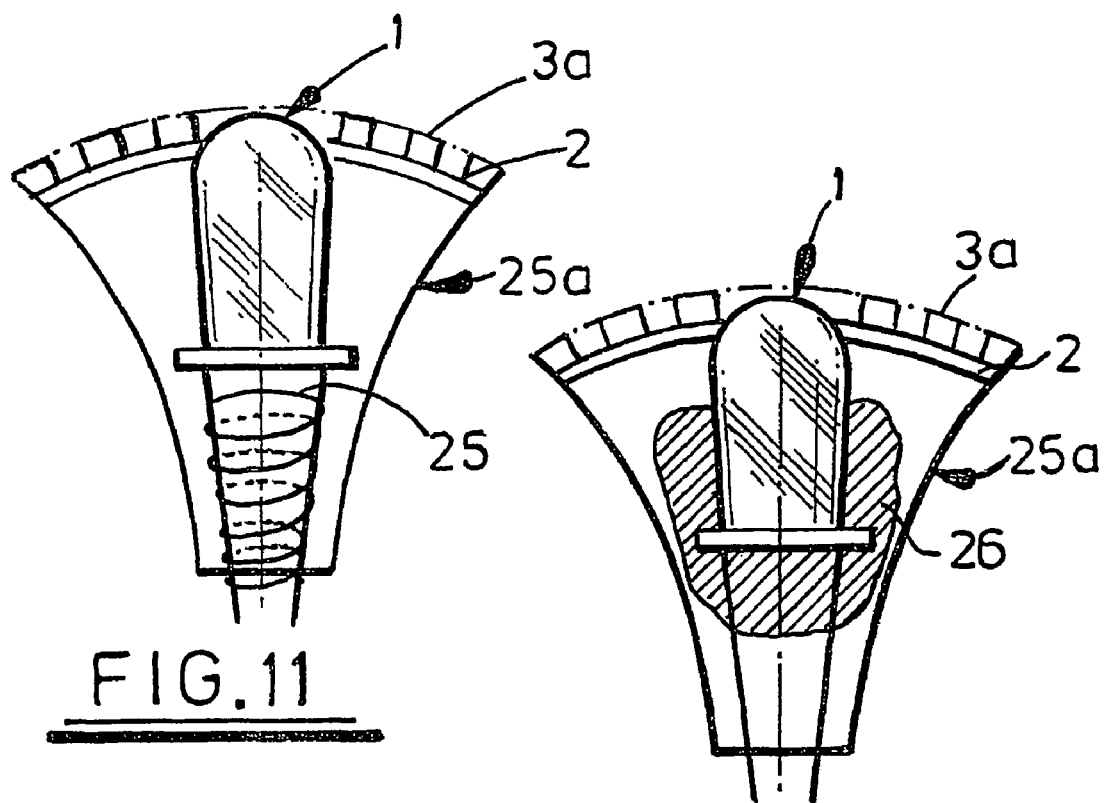

WHEEL LIGHTS

This invention concerns wheel lights.

In order to allow a user of a bicycle, or other form of wheeled transport, to travel safely in the dark, it is known to provide lighting devices, which may be switched on or off according to need. In the case of a bicycle, the lighting devices are in general attached to the frame of the bike, at a suitable location, for example, at the front and/or the back, and may be battery powered. Alternatively, in the case of a bicycle, the lighting device may be powered by means of a dynamo, whereby the lighting device is switched on in response to a user turning the pedals of the bicycle.

However, such lighting devices are cumbersome, and often spoil the aesthetic appeal of the vehicle, such as a bicycle, to which they are attached. Furthermore, the light from the lighting devices may not be clearly visible from the side, and in addition, they may be prone to falling off, or slipping around on, the vehicle to which they are attached. Also, due to the nature of their attachment, i.e. brackets and bolts, they may damage the paintwork when they are attached to the bicycle.

In addition, due to the necessity for a number of batteries in known lighting devices, they can add considerable weight to a bicycle.

It is an object of the present invention to provide lights for a wheel, which overcome or at least alleviate, the above-mentioned disadvantages.

Accordingly, the present invention provides a lighting system for a wheel having a tyre, comprising at least one powered light emitter, wherein the at least one light emitter is at least partly embedded in a part of the tyre of the wheel.

In a preferred embodiment, the at least one light emitter is at least partly embedded between the tread of the tyre of the wheel, the tyre having a corresponding number of holes therein, in which the light emitters are held. More preferably still, the tip of the luminescent part of the light emitter lies below the level of the wheel tread, and it is further preferable that the light emitter is a light emitting diode.

It is preferred that a plurality of light emitters, even more preferably four, are situated at equal intervals around the wheel. More preferably still, the plurality of light emitters are part of a circuit whereby they are connected in series to a power supply, such as a battery. The battery may be of any suitable type, such as a general purpose nine volt battery.

It is further preferable that the light emitters are run by a photo cell, which would enable the light emitters to automatically switch on when it becomes dark. Alternatively, the light emitters may be operated by remote control. Preferably, all of the components making up the circuit, apart from the luminescent part of the light emitter, are held inside the tyre. For example, in the case where the wheel comprises an inner tube, the circuit components are held between the outer shell and the inner tube. In this way, such components are not visible from the outside, and are protected from damage.

As an alternative means of operation of the light emitters, the circuit may comprise a coil, a capacitor, and a resistor, whereby a voltage is induced in the coil when the coil moves relative to a magnetic field, which is provided by magnets attached to the frame of the bicycle. The current induced then operates the light emitters, and furthermore, the capacitor stores the charge to enable the light emitters to be operated even when the wheel is not turning. It is preferred that the magnet is attached to the frame of the bicycle by means of a bracket, and further, it is preferable that the magnet is adjustable either by hand or by a cable attached to the handlebars of the bike, to prevent voltage from being induced in the coil, when it is desired to stop the operation of the light emitters.

More preferably still, all of those components apart from the bulbs and the connecting wires, are held in a substantially waterproof component enclosing means, such as a sealed waterproof bag, within the tyre. It is preferable that the waterproof component enclosing means is attached to the inside surface of the outer shell of the tyre by means of a suitable adhesive, such as glue, or alternatively, Velcro™.

Preferably, the connecting wires are attached to the side inside surface of the outer shell of the tyre, for example, by means of glue, silicone or adhesive tape.

It is preferred that an adhesive tyre patch is also used in order to help keep the light emitter in place on the inside surface of the outer shell of the tyre. Preferably, a washer is also provided for each light emitter, and in use, it is placed over the base of the light emitter onto the inside surface of the outer shell of the tyre, located between the inside of the tyre and the base of the light emitter, in order to alleviate damage to the light emitter. Preferably, the washers are made from rubber or cardboard. It is also preferable that a suitable waterproofing sealant, such as silicone, is used around the hole in the outer shell, in order to prevent the ingress of water between the outer shell and the inner tube.

It is preferred that the circuit also comprises a manually operated switch, which is accessible from the outside of the tyre, and which is used to switch the light emitters on and off as required, by way of completing the circuit. It is preferable that the switch has a substantially waterproof covering thereon, in order to prevent the ingress of water into the internal components thereof.

Alternatively, the switch may be a magnetically operated switch such as a Reed Switch, whereby in order to activate the switch and thereby switch the light emitters on, a magnet is placed sufficiently near the switch, thereby completing the circuit and switching on the light emitters. It is preferred that the Reed Switch is located inside the tyre, and it is further preferable that the Reed Switch is held between the outer shell and the inner tube, along with the other components of the circuit. Preferably, the Reed Switch is held within a protective sheath such as a plastic or an aluminium tube. It is preferable that a magnet holder is located on the outside of the tyre in the vicinity of the Reed Switch, such that, when the light emitters are to be switched on, a magnet is slotted into the magnet holder, and is held therein. Alternatively, the magnet may be releasably attached to the outside of the wheel in the vicinity of the Reed Switch by means of Velcro™, whereby a corresponding strip of Velcro™ is attached to the magnet.

Preferably, the light emitters provide a constant source of light when the circuit is completed, or alternatively, they may provide a discontinuous source of light, flashing on and off in sequence or simultaneously. It is preferred that white light emitters are attached to the front wheel or wheels of the vehicle, and that red light emitters are attached to the rear wheel or wheels of the vehicle, although any colours may be used.

The present invention will now be described further hereinafter, by way of example only, with reference to the accompanying drawings in which:—

FIG. 10 shows a front view of the light emitters in accordance with the present invention, in situ on a wheel, and showing hidden detail;

FIG. 11 shows a light emitter mounted in accordance with the present invention; and FIG. 11a shows a light emitter mounted in accordance with the present invention.

Figure 1:
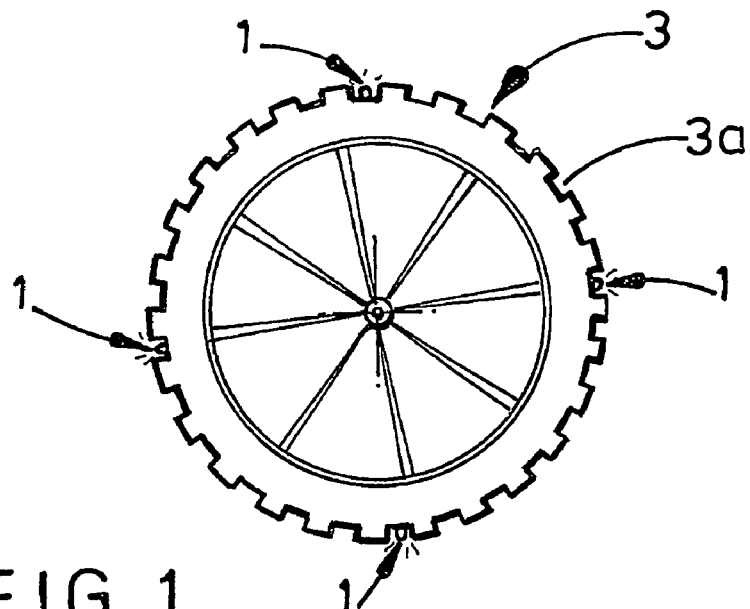
FIG. 1 is a side view of the light emitters in accordance with the present invention, in situ on a wheel.

With reference to the accompanying drawings, a light emitter in the form of a light emitting diode is indicated by reference numeral 1. Light emitting diodes in particular are chosen because they are relatively cheap and long-lasting, and because, when switched on, they can be seen from a great distance.

Figure 2:
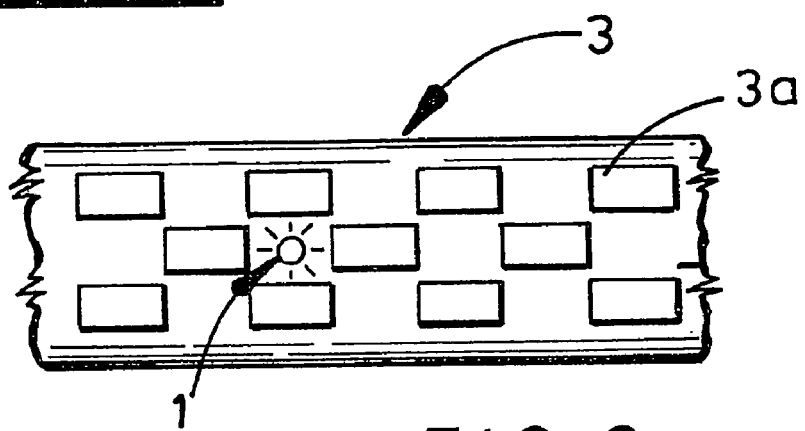
FIG. 2 is a top plan view of a light emitter in accordance with the present invention, in situ on a wheel.

As can be seen from FIGS. 1 and 2 in particular, the light emitters 1 are embedded between the tread 3a of the outer shell of the wheel 3, such that in use, the tip of the bulb part 4 of the light emitter 1 lies below the level of the tread 3a of the wheel.

Figure 3:
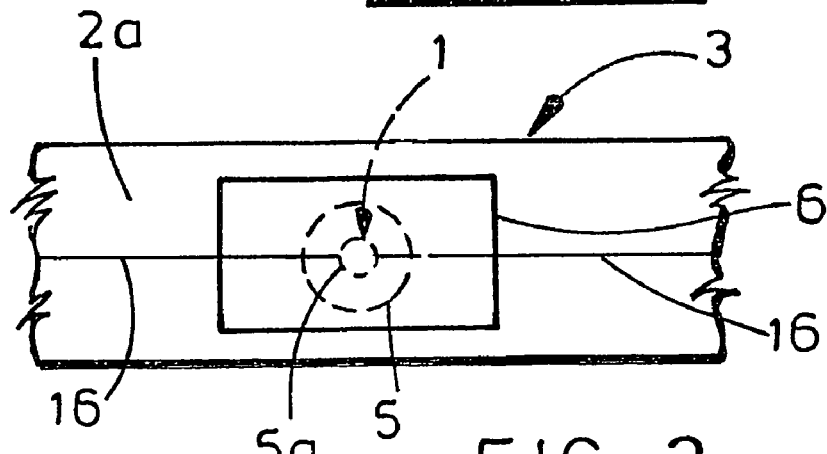
FIG. 3 is an underneath plan view of a light emitter in accordance with the present invention, in situ on the inside surface of the outer shell of a wheel and showing hidden detail.
Figure 4:
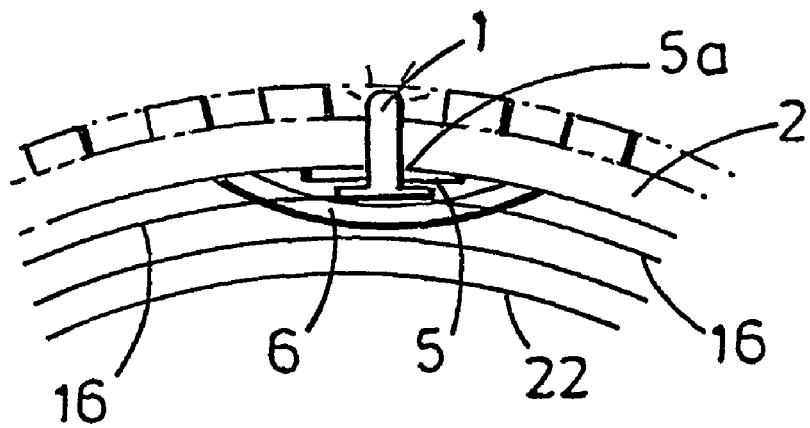
FIG. 4 is a side view of a light emitter in accordance with the present invention, in situ on a wheel and showing hidden detail.

As can be seen from FIGS. 3 and 4 of the drawings, the bulb part of the light emitter 1 is held within a hole 5a in the outer shell 2 of the wheel 3, which is of the same diameter as the bulb part 4 of the light emitter 1. A washer 5 is placed over the light emitter 1, and in use, is located against the inside surface 2a of the outer shell 2 of the wheel 3. The inner tube of the tyre is indicated by reference numeral 22. The washer 5 serves to protect the light emitter 1 from damage. Furthermore, the washer 5 prevents the bulb part of the light emitter 1 from projecting too far out from the tyre, which would increase the likelihood of damage. In general, the light emitters 1 in the form of light emitting diodes are approximately 5 mm in diameter, and so consequently, the holes 5a in the outer shell 2 are also 5 mm in diameter. An adhesive tyre patch 6 is placed over the back of the light emitter 1, also covering the washer 5, adhering to the inside surface of the outer shell 2, in order to hold the light emitter 1 in place. Furthermore, the tyre patch 6 serves to prevent air from escaping from the tyre if a tyre without an inner tube is used.

Figure 5:
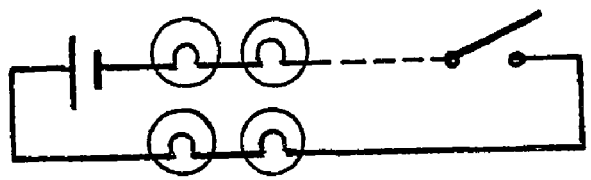
FIG. 5 shows a light emitter circuit, in accordance with the present invention.
Figure 6:
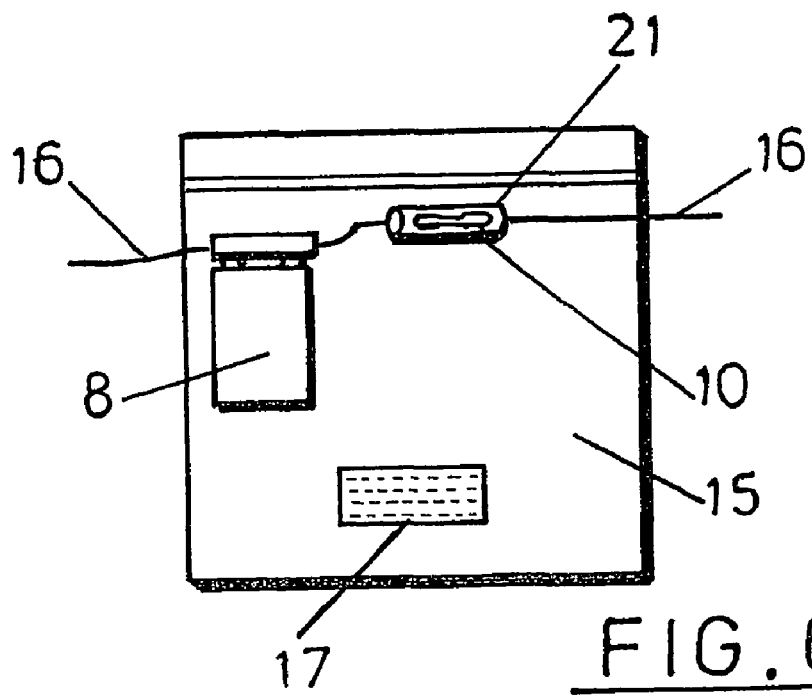
FIG. 6 shows some of the components of the light emitter circuit, in accordance with the present invention.
Figure 7:
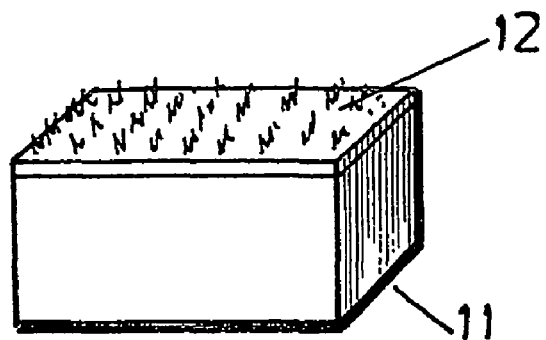
FIG. 7 shows a magnet component, in accordance with the present invention.

As shown in FIGS. 5, 6 and 7 of the drawings, a light emitter circuit 7 comprises a plurality of light emitters 1, connected in series by connecting wires 16 to a nine volt battery 8. Also included in the circuit 7 is a Reed Switch 10, which closes the circuit 7 when a magnet 11 is placed in the vicinity thereof. As can be seen in FIG. 7 of the drawings in particular, the magnet 11 has Velcro™ 12 attached to a side thereof, which adheres to a strip of Velcro, (not shown) which is attached to a suitable location on the outside of the tyre, i.e. near the Reed Switch. As can be seen from FIG. 6 of the drawings in particular, some of the components, for example, the battery 8, and its connector 14, along with the Reed Switch 10, are held inside the tyre 2 within a sealable waterproof wallet 15, such as made from plastic. The sealable waterproof wallet 15 has a strip of Velcro™ 17 attached thereto, which adheres to another strip of Velcro™ 18 attached to the inside of the outer tyre 2. In this way, the components of the circuit 7 may be releasably held in place. Further, the Reed Switch 10 is held within a protective tube 21.

Figure 8:
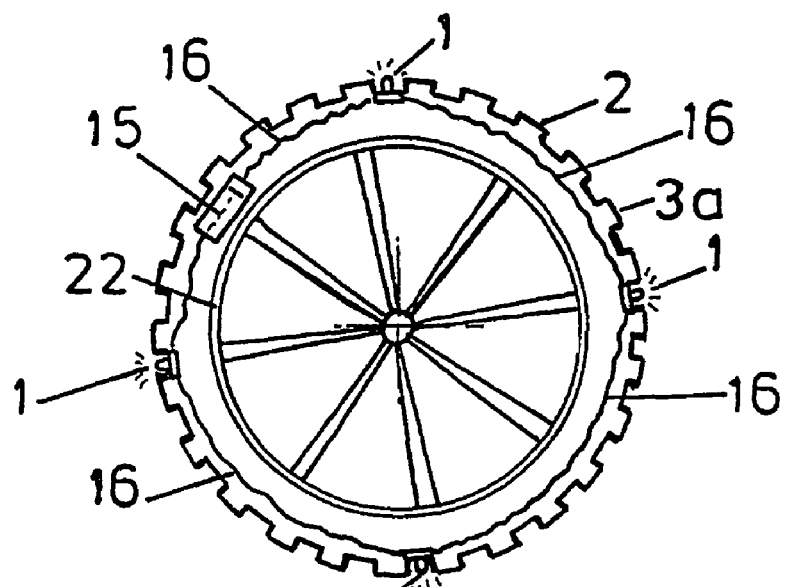
FIG. 8 is a side view of the light emitters in accordance with the present invention, in situ on a wheel, and showing hidden detail.

As can be seen from FIG. 8, the connecting wires 16 travel round the perimeter of the inside wall of the outer shell 2, and are attached to the inside side wall of the outer shell. In this way, if the tyre becomes punctured, then the wires 16 are located such that they are not damaged.

Figure 9:
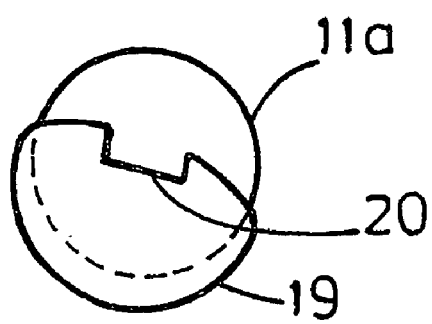
FIG. 9 is a perspective view of a magnet holder, in accordance with the present invention.

FIG. 9 shows an alternative means of attaching the magnet 11 to the outside of the tyre, using a magnet holder 19, which is attached to the outside of the tyre, having a pocket 20 therein into which a suitably sized and shaped magnet 11a is inserted as required.

FIG. 10 shows the location of coils 21 and a magnet 22, which together are used to induce a current in the circuit, to operate the light emitters 1. A voltage is induced in the coil 21, when it moves past the magnet 22 as the wheel turns. In this way, the light emitters 1 are operated, and furthermore, a capacitor (not shown) in the circuit stores charge, which enables the light emitters 1 to operate even when the wheel is not turning. The magnet 22 is attached to the frame 23 of the bicycle by means of an adjustable bracket 24, which enables the magnet 22 to be moved to stop the induction of voltage in the coil 21 if it is desired that the light emitters 1 are to be switched off. In this way, the need for batteries is alleviated, thereby providing an inexpensive means of providing light.

As can be seen from FIGS. 11 and 11a, the light emitter 1 may be mounted in a substantially conically shaped component 25a, comprising a spring 25 (see FIG. 11) which acts as a shock absorber when the light emitter 1 is in situ on the tyre. Alternatively, air or oil 26 may be used (see FIG. 11a) to act as a shock absorber, thereby protecting the light emitter 1 from damage as the wheel contacts the ground.

The wheel lights of the invention provide a safe, hard wearing, relatively cheap and light, wheel light, which can be seen from a great distance. The light emitter circuit, when powered by, for example, a standard nine volt battery, last a relatively long time. As an example, when four light emitters in the form of light emitting diodes, are connected in series, a standard nine volt battery provides about two weeks worth of constant light before running out. Accordingly, in this case, if the lighting system was used for one hour per night, then this means that the battery should last for about 336 days. If the lighting system was used for half an hour per night, then it would run for 672 nights.

The lighting system of the invention is especially noticeable when the lights are in flashing mode, and furthermore, as the wheel turns, the lights have the appearance of a constant line round the circumference of the wheel.

What is claimed is:

1. A lighting system for a wheel having a tyre, comprising at least one powered light emitter, wherein the at least one light emitter is at least partly embedded in a part of the tyre of the wheel, and wherein the at least one light emitter is at least partly embedded between the tread of the tyre of the wheel, the tyre having a corresponding number of holes therein, in which the light emitters are held.

2. A lighting system for a wheel having a tyre as claimed in claim 1, wherein the tip of luminescent part of the light emitter lies below the level of the wheel tread.

3. A lighting system for a wheel having a tyre according to claim 1, wherein the light emitter is a light emitting diode.

4. A lighting system for a wheel having a tyre according to claim 1, wherein a plurality of light emitters are situated at equal intervals around the wheel.

5. A lighting system for a wheel having a tyre as claimed in claim 4, wherein four light emitters are situated at equal intervals around the wheel.

6. A lighting system for a wheel having a tyre according to claim 1, wherein the plurality of light emitters are part of a circuit whereby they are connected in series to a power supply.

7. A lighting system for a wheel having a tyre as claimed in claim 6, wherein the battery is a conventional nine volt battery.

8. A lighting system for a wheel having a tyre according to claim 6, wherein the circuit further comprises a photo cell.

9. A lighting system for a wheel having a tyre according to claim 6, wherein the light emitters are operated by remote control.

10. A lighting system for a wheel having a tyre according to claim 6, wherein the circuit further comprises a coil, a capacitor and a resistor, whereby a voltage is induced in the coil when the coil moves relative to a magnet, which is attached to the frame of a bicycle.

11. A lighting system as claimed in claim 10, wherein the magnet is attached to the frame of the bicycle by means of a bracket.

12. A lighting system as claimed in claim 11, wherein the bracket is adjustable by hand.

13. A lighting system as claimed in claim 11, wherein the bracket is adjustable by means of a cable, one end of which is attached to the bracket, and the other end of which is attached to at least one handlebar of the bicycle.

14. A lighting system for a wheel having a tyre according to claim 6, wherein the all of the components making up the circuit, apart from the luminescent part of the light emitter, are held inside the tyre.

15. A lighting system for a wheel having a tyre according to claim 6, wherein the tyre comprises an inner tube, and the circuit components are held between an outer shell and the inner tube of the tyre.

16. A lighting system for a wheel having a tyre according to claim 14, wherein all of the circuit components apart from the light emitters and connecting wires are held within a substantially waterproof component enclosing means within the tyre.

17. A lighting system for a wheel having a tyre as claimed in claim 16, wherein the substantially waterproof component enclosing means is a sealed waterproof bag.

18. A lighting system for a wheel having a tyre according to claim 16, wherein the substantially waterproof component enclosing means is attached to the inside surface of the outer shell of the tyre by means of a suitable adhesive.

19. A lighting system for a wheel having a tyre according to claim 15, wherein the connecting wires are attached to the side inside surface of the outer shell of the tyre by means of a suitable adhesive.

20. A lighting system for a wheel having a tyre according to claim 1, wherein an adhesive tyre patch is used in order to help keep the light emitter in place on the inside surface of the outer shell of the tyre.

21. A lighting system for a wheel having a tyre according to claim 1, wherein a washer is provided for each light emitter, whereby in use, it is placed over a base of the lighting emitter onto the inside surface of the outer shell of the tyre, and whereby it locates between the inside of the tyre and the base of the light emitter.

22. A lighting system for a wheel having a tyre as claimed in claim 21, wherein the washer is made from cardboard.

23. A lighting system for a wheel having a tyre as claimed in claim 21, wherein the washer is made from rubber.

24. A lighting system for a wheel having a tyre according to claim 15, wherein a suitable waterproofing sealant is applied around a hole in the outer shell of the tyre.

25. A lighting system for a wheel having a tyre according to claim 6, wherein the circuit comprises a manually operated switch, which is accessible from the outside of the tyre, and which is used to switch the light emitters on and off as required, by way of completing the circuit.

26. A lighting system for a wheel having a tyre as claimed in claim 25, wherein the switch has a substantially waterproof covering thereon, in order to prevent the ingress of water into the internal components thereof.

27. A lighting system for a wheel having a tyre as claimed in claim 25, wherein the switch is a magnetically operated switch, whereby in order to activate the switch and thereby switch the light emitters on, a magnet is placed sufficiently near the switch, thereby completing the circuit and switching on the light emitters.

28. A lighting system for a wheel having a tyre as claimed in claim 27, wherein the magnetically operated switch is located inside the tyre.

29. A lighting system for a wheel having a tyre as claimed in claim 28, wherein the magnetically operated switch is held between the outer shell of the tyre and the inner tube, along with the other components of the circuit.

30. A lighting system for a wheel having a tyre according to claim 27, wherein the magnetically operated switch is held within a protective sheath such as a plastic or an aluminum tube.

31. A lighting system for a wheel having a tyre according to claim 27, wherein a magnet holder is located on the outside of the tyre in the vicinity of the magnetically operated switch, such that, when the light emitters are to be switched on, a magnet is slotted into the pocket of the magnet holder, and is held therein.

32. A lighting system for a wheel having a tyre according to claim 27, wherein a magnet is attachable to the outside of the tyre in the vicinity of the magnetically operated switch by means of hook and loop material, whereby a corresponding strip of hook and loop material is attached to the magnet.

33. A lighting system for a wheel having a tyre according to claim 6, wherein the light emitters provide a constant source of light when the circuit is completed.

34. A lighting system for a wheel having a tyre according to claim 6, wherein the light emitters provide a discontinuous source of light when the circuit is completed.

35. A lighting system for a wheel having a tyre as claimed in claim 34, wherein the light emitters flash on and off in sequence when the circuit is completed.

36. A lighting system for a wheel having a tyre as claimed in claim 34, wherein the light emitters flash on and off simultaneously when the circuit is completed.

37. A lighting system for a wheel having a tyre according to claim 2, wherein white light emitters are attached to a front wheel of a vehicle.

38. A lighting system for a wheel having a tyre according to claim 1, wherein red light emitters are attached to a back wheel of a vehicle.

* * * * *